(12) United States Patent
Ludewigt et al.

(10) Patent No.: US 6,873,633 B2
(45) Date of Patent: Mar. 29, 2005

(54) SOLID-STATE LASER

(75) Inventors: Klaus Ludewigt, Oststeinbeck (DE); Frank-Peter Grundmann, Hamburg (DE)

(73) Assignee: Rofin-Sinar Laser GmbH, Hamburg (DE)

(*) Notice: Subject to any disclaimer, the term of this patent is extended or adjusted under 35 U.S.C. 154(b) by 52 days.

(21) Appl. No.: 10/016,864

(22) Filed: Dec. 14, 2001

(65) Prior Publication Data

US 2002/0075934 A1 Jun. 20, 2002

Related U.S. Application Data

(63) Continuation of application No. PCT/EP00/05049, filed on Jun. 2, 2000.

(30) Foreign Application Priority Data

Jun. 14, 1999 (DE) .......................................... 199 27 054

(51) Int. Cl.⁷ .............................. H01S 3/14; H01S 3/06; H01S 3/07
(52) U.S. Cl. .............................. 372/39; 372/66; 372/67; 372/68; 372/92
(58) Field of Search .............................. 372/67, 68, 70, 372/93, 98, 101, 92, 39, 66

(56) References Cited

U.S. PATENT DOCUMENTS

| | | | |
|---|---|---|---|
| 3,727,219 A | * | 4/1973 | Graham ........................ 342/25 |
| 5,148,441 A | * | 9/1992 | Itai .............................. 372/70 |
| 5,553,088 A | * | 9/1996 | Brauch et al. ................. 372/34 |
| 5,926,494 A | * | 7/1999 | Pepper ......................... 372/70 |

FOREIGN PATENT DOCUMENTS

| | | |
|---|---|---|
| DE | 195 41 020 A1 | 5/1997 |
| DE | 19728845 | * 1/1999 |
| DE | 197 28 845 A1 | 1/1999 |
| DE | 197 46 835 A1 | 5/1999 |
| DE | 198 35 108 A1 | 2/2000 |
| EP | 0 860 041 B1 | 8/1998 |
| FR | 2 785 098 | 4/2000 |
| FR | 2785098 | * 4/2000 |
| JP | 09312430 | * 12/1997 |
| JP | 09 312 430 | 12/1997 |

OTHER PUBLICATIONS

A. Giesen et al.: Scalable Concept for Diode–Pumped High–Power Solid–State Laser, Appl. Phys., vol. B 58, 1994, pp. 365–372.

* cited by examiner

Primary Examiner—Minsun Oh Harvey
Assistant Examiner—Armando Rodriguez
(74) Attorney, Agent, or Firm—Laurence A. Greenberg; Werner H. Stemer; Ralph E. Locher

(57) ABSTRACT

A solid-state laser having an active medium for generating a laser beam is described. The laser includes a resonator, and a plurality of crystal wafers disposed in the resonator and are optically coupled to one another and form a common beam path for the laser beam. A pumping light source is provided for generating a pumping light beam whose optical axis is collinear with respect to an optical axis of the laser beam. The pumping light source is disposed upstream of the resonator. At least one lens functioning as an imaging element is provided for focusing the pumping light beam emerging from one of the crystal wafers onto another one of the crystal wafers disposed downstream.

12 Claims, 6 Drawing Sheets

SOLID-STATE LASER

CROSS-REFERENCE TO RELATED APPLICATION

This application is a continuation of copending International Application PCT/EP00/05049, filed Jun. 2, 2000, which designated the United States.

BACKGROUND OF THE INVENTION

FIELD OF THE INVENTION

The invention relates to a solid-state laser in which a crystal wafer is used as a laser-active medium.

Such a solid-state laser is disclosed for example in U.S. Pat. No. 5,553,088 or in the Published, Non-Prosecuted German Patent Application DE 197 46 835 A1. The laser-active basic element of such a solid-state laser, also referred to as wafer-type laser in the literature, is a thin crystal wafer which is only a few tenths of a millimeter thick and typically has a diameter of the order of magnitude in the region of about 10 mm, which crystal wafer is disposed on a cooling element and is provided with a reflective layer on its surface facing the cooling element.

The laser output power generated by such a wafer-type laser is determined, inter alia by the power of the pumping light beam used for optical pumping, which power is absorbed in the crystal wafer. There are two possibilities, in principle, for coupling the pumping light beam into the crystal wafer. The pumping light beam can be coupled in either at a flat side of the crystal wafer (longitudinally) or at the narrow side (transversely or radially).

A longitudinal pumping configuration has the fundamental disadvantage that, on account of the small path length of the pumping light beam in the crystal a considerable part of the pumping light beam is not absorbed within the crystal wafer and, consequently, does not make any contribution to the laser excitation. With the use of Yb:YAG as the laser-active medium with a doping of about 12% and a wafer thickness of 200 $\mu$m, an absorption of only about 30% is produced, for example, at a wavelength of the pumping light beam of 940 nm in the case of a simple passage of the pumping light beam through the wafer. In order to increase the utilization of the pumping power provided in the case of a longitudinal pumping configuration, it is proposed to use a configuration in which the pumping light beam is reflected back multiply to the wafer (see FIG. 28 of U.S. Pat. No. 5,553,088 or FIG. 2 of the publication titled "Effiziente diodengepumpte Scheibenlaser mit nahezu beugungsbegrenzter Strahlung" [Efficient Diode-Pumped Wafer Lasers With Virtually Defraction-Limited Radiation], Laser und Optoelektronik, 29(4), 1997, pp. 76–83). However, this requires a complicated optical construction with a multiplicity of focusing mirrors.

These problems can be avoided by a transverse pumping configuration, since the path length of the pumping light beam in the crystal wafer is then increased (see, for example, FIG. 1 of U.S. Pat. No. 5,533,088). In the case of such a pumping configuration, each crystal wafer is surrounded by a multiplicity of laser diodes. Such a configuration is also suitable, in principle, for constructing a high-power laser, in which it is necessary for a plurality of wafer-type lasers to be optically coupled to one another.

Specifically, the output power of a crystal wafer is limited to about 500 watts per wafer at the present time even in the event of maximum absorption of the pumping light power, since the wafer's usable area and thickness cannot be increased, the latter in particular on account of the required dissipation of heat and on account of the reduction of the breaking strength that accompanies increasing thickness. In order to provide a wafer-type laser with output powers in the region of a few kilowatts, it is necessary, therefore, to use a plurality of crystal wafers. For this purpose it is known from U.S. Pat. No. 5,553,088, in particular FIG. 17, for a plurality of crystal wafers to be optically coupled to one another in a so-called folded beam path, each crystal wafer being transversely surrounded by a multiplicity of pumping light sources in order to ensure a high absorption of the pumping light beam. However, such a construction is technically very complicated since each crystal wafer is assigned a pumping configuration. Moreover, a considerable part of the pumping light beam is absorbed in edge zones of the crystal wafer which do not contribute or contribute only a small proportion to the laser beam generation.

SUMMARY OF THE INVENTION

It is accordingly an object of the invention to provide a solid-state laser which overcomes the above-mentioned disadvantages of the prior art devices of this general type, whose active medium, for generating a high output power, is constructed from a plurality of crystal wafers which are disposed in a resonator and are optically coupled to one another, and enables a technically uncomplicated construction.

With the foregoing and other objects in view there is provided, in accordance with the invention, a solid-state laser having an active medium for generating a laser beam. The laser includes a resonator, and a plurality of crystal wafers disposed in the resonator and are optically coupled to one another and form a common beam path for the laser beam. A pumping light source is provided for generating a pumping light beam whose optical axis is collinear with respect to an optical axis of the laser beam. The pumping light source is disposed upstream of the resonator. At least one lens functioning as an imaging element is provided for focusing the pumping light beam emerging from one of the crystal wafers onto another one of the crystal wafers disposed downstream. The lens is disposed within the resonator.

The solid-state laser according to the invention contains an active medium for generating a laser beam, which includes a plurality of crystal wafers which are disposed in a resonator and are optically coupled to one another and form a common beam path for the laser beam, provision being made of a pumping light source for generating a pumping light beam whose optical axis intersects the flat sides of a plurality of crystal wafers that are optically disposed one after the other.

This makes it possible for a plurality of crystal wafers to be optically pumped using a single pumping light source. The pumping light source may additionally be disposed outside the resonator as a unit which is structurally separate from the resonator. As a result, the construction of the resonator is simplified and the ease of maintenance of the solid-state laser is increased. In this case, the term pumping light source is to be understood such that it can also be constructed by a multiplicity of individual light sources, for example laser diodes, whose individual pumping light beams are combined to form a pumping light beam.

In this case, the invention is based on the consideration that only a relatively small proportion, in practice less than 30%, of the pumping light beam which traverses the crystal wafer twice in the case of a longitudinal pumping configuration is absorbed and so the pumping light beam can efficiently be used for optically pumping a further crystal wafer disposed in the beam path of the reflected pumping light beam. Consequently, in contrast to the longitudinally pumped configurations known in the prior art, the pumping light is not coupled into the same crystal wafer again, but rather is used for pumping a crystal wafer disposed optically downstream.

In an advantageous refinement of the invention, the laser beam and pumping light beam propagate in the same plane. In other words, the optical axes of the pumping light beam and the laser beam are coplanar. A particularly compact construction of the solid-state laser can be obtained by virtue of this measure.

In a further advantageous refinement of the invention, the pumping light beam and the laser beam run collinearly, in particular the optical axis of the light beam coinciding with the optical axis of the pumping light beam. This enables the solid-state laser to have a particularly compact construction.

As an alternative to this, it is also possible, still with a coplanar configuration of the optical axes of the pumping light beam and the laser beam, for the latter to be disposed in an inclined manner with respect to one another. This enables the resonator geometry to be decoupled from the geometry of the beam course of the pumping light beam.

Preferably, a respective one of the flat sides of the crystal wafers is assigned a mirror surface that reflects the pumping light beam and the laser beam back into the crystal wafer. As a result, first the optical path length of the pumping light beam is increased. Second, it is also possible to construct the crystal wafers on an optically opaque, metallic cooling element that is a good conductor of heat.

In a particularly preferred refinement, the crystal wafers are disposed in such a way as to produce a folded beam path for the laser beam. This enables the resonator to have a compact construction.

In a particularly preferred refinement of the invention, the crystal wafers that are optically disposed one after the other in the propagation direction of the pumping light beam essentially absorb the same pumping light power. This measure ensures that each of the crystal wafers contributes the same laser power to the entire solid-state laser and is thermally loaded in the same way, so that the structural configuration of the cooling elements on which the crystal wafers are respectively situated is the same. The structural outlay is reduced as a result.

The absorbed pumping light power is preferably equalized by varying the thickness of the crystal wafers, in which case, when only a single pumping light beam is used, the thickness of the crystal wafers increases in the propagation direction of the pumping light beam.

When two oppositely coupled-in pumping light beams of approximately the same intensity are used, it is accordingly advantageous to dispose the crystal wafers in such a way that the thickness of the crystal wafers decreases from the center toward the edge, so that the wafer thickness distribution is symmetrical with respect to the center of the resonator. In other words, the two outer crystal wafers have the same thickness and are thinner than the inner crystal wafers.

In an alternative refinement of the invention, in order to equalize the absorbed pumping power, it is provided that crystal wafers are used whose chemical composition, in particular whose doping, is different one from the other, in which case, when only a single pumping light beam is used, the doping increases in the propagation direction of the pumping light beam from crystal wafer to crystal wafer.

In a further advantageous refinement of the invention, at least one imaging element for focusing the pumping light beam emerging from a crystal wafer onto the optically downstream crystal wafer is disposed within the resonator. What is thereby achieved is that the pumping light beam which emerges from the crystal wafer and has a poor beam quality, i.e. a high degree of divergence, is completely utilized for the purpose of excitation for the next crystal wafer as well. The pumping light beam that emerges divergently from the upstream crystal wafer is concentrated, so that it impinges on the optically downstream crystal wafer with a predetermined beam diameter. In this case, the pumping light beam emerging from the upstream crystal wafer is preferably imaged into the optically downstream crystal wafer, i.e. the downstream crystal wafer is situated approximately in the image plane and the upstream crystal wafer is situated approximately in the object plane of the imaging element.

In a further preferred embodiment, the imaging element essentially influences only the beam path of the pumping light beam, since resonator-internal beam shaping of the laser beam is not necessary on account of the high beam quality of the laser beam.

In a further preferred refinement of the invention, the optical axis of the pumping light beam and the optical axis of the laser beam are approximately collinear with respect to one another. This enables a particularly compact construction with few optical components, since, in this case, the crystal wafers simultaneously define the propagation direction of the pumping light beam.

A lens with a central opening is preferably provided as the imaging element. As a result, only the beam path of the pumping light beam is influenced by the imaging element and the laser beam, which has a low degree of divergence, propagates undisturbed in the resonator.

As an alternative to this, the imaging element provided may also be a lens whose surface is curved only in an annular edge region and whose central region behaves optically like a plate with plane-parallel surfaces.

In a further advantageous refinement of the invention, a pumping light beam with an annular cross section is coupled into the resonator.

In a further preferred embodiment, the imaging element provided is a mirror element with a plane surface which reflects the laser beam and transmits the pumping light beam in a wavelength-selective manner, and with a reflective concave surface disposed optically downstream. As an alternative to this, the plane surface is mirror-coated in a central region and is transmissive for the pumping light beam in a region annularly surrounding the central region.

In an alternative embodiment, the imaging element influences both the beam path of the laser beam and the beam path of the pumping light beam, in particular at least one of the resonator mirrors having a reflecting surface which is curved in such a way that the latter, together with the resonator-internal imaging elements, form a stable resonator.

Preferably in order to couple the pumping light beam into the resonator, a wavelength-selective resonator mirror is provided, which is reflective for the laser beam and transmissive for the pumping light beam. This enables particularly simple coupling of the pumping light beam into the resonator.

As an alternative to this, a beam splitter may also be provided for coupling the pumping light beam into the beam path of the laser beam.

In a further preferred refinement of the invention, in order to couple at the laser beam, a wavelength-selective resonator mirror is provided, which transmits (couples out) at least part of the laser beam and reflects the pumping light beam. Particularly efficient utilization of the pumping power is achieved as a result.

In a further preferred embodiment, the optical access of the pumping light beam runs at least partially in an inclined manner with respect to the optical axis of the laser beam, the imaging element or elements for imaging the pumping light beam being disposed outside the resonator volume encompassed by the laser beam. This measure makes it possible to provide configurations in which it can be ensured in a simple manner that the imaging elements required for imaging or focusing the pumping light beam do not influence the beam path of the laser beam.

Preferably, at least two pumping light beams are coupled into the resonator, and propagate in mutually opposite directions in the resonator. In this way, in conjunction with collinear optical axes, the number of crystal wafers disposed one after the other in a folded beam path can be increased.

Other features which are considered as characteristic for the invention are set forth in the appended claims.

Although the invention is illustrated and described herein as embodied in a solid-state laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
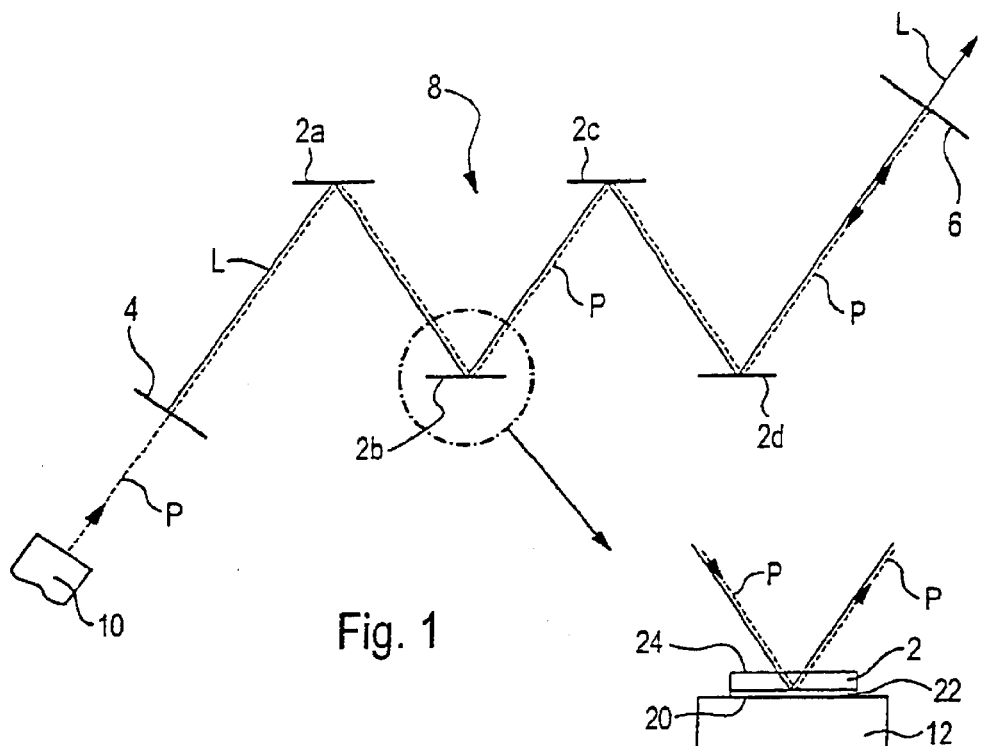
FIG. 1 is a diagrammatic, basic illustration of a solid-state laser according to the invention.

Referring now to the figures of the drawing in detail and first, particularly, to FIG. 1 thereof, there is shown a solid-state laser containing four crystal wafers 2a–2d which are mirror-coated on a rear side and, together with a resonator mirror 4 serving as an end mirror and a resonator mirror 6 serving as coupling-out mirror, define a resonator 8 with a folded beam path for a laser beam L. Disposed outside the resonator 8 is a pumping light source 10 that generates a pumping light beam P that is coupled into the resonator 8 via the resonator mirror 4. For this purpose, the resonator mirror 4 serving as the end mirror is highly reflective of the laser beam L and transmissive for the pumping light beam P.

In the exemplary embodiment, the resonator mirror 6 serving as the coupling-out mirror is highly reflective for the pumping light beam P and partly transmissive (5 to 10%) for the laser beam L.

The optical axis of the pumping light beam P and the laser beam L is composed of a plurality of sections that run in a zigzag manner between the crystal wafers 2a–2d. These sections each span a plane, so that both the optical axis of the pumping light beam P and the optical axis of the laser beam L lie in one plane. The optical axis of the pumping light beam P and the optical axis of the laser beam L are additionally coplanar with respect to one another within the resonator 8, that is to say they run in a common plane. In the exemplary embodiment, the optical axis of the pumping light beam P and the optical axis of the laser beam L additionally run collinearly with respect to one another within the resonator 8 and coincide.

In this case, FIG. 1 illustrates both the pumping light beam P and the laser beam L by representing the respectively associated optical axes, in which case, in order to increase the clarity, the line representing the optical axis of the pumping light beam P is broken and the line representing the optical axis of the laser beam L is solid. In reality, the pumping light beam P and the laser beam L each contain a pencil of rays, the laser beam L forming a virtually parallel pencil of rays on account of its high beam quality, whereas the pumping light beam P has a high degree of divergence.

Figure 2:
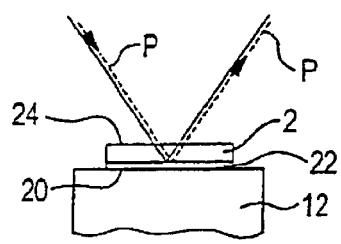
FIG. 2 is a sectional view through a basic construction of a laser element containing a crystal wafer.

In accordance with FIG. 2, each crystal wafer 2 is disposed on a cooling element 12, an intermediate layer made of ductile metal which is a good conductor of heat being used in order to increase the thermal conductivity, a good thermal contact between the cooling element 12 and the crystal wafer 2 thereby being ensured. On its flat side 20 facing the cooling element 12, the crystal wafer 2 is provided with a reflective layer 22, so that the pumping light beam P entering on the opposite flat side 24 is reflected after traversing the crystal wafer 2 in a thickness direction thereof, traverses the crystal wafer 2 again and emerges from the flat side 24. This consequently involves a longitudinal pumping configuration, i.e. the pumping light beam P enters at one of the flat sides, the flat side 24 in the example, of the crystal wafer 2 and emerges again at one of the flat sides, likewise the flat side 24 in the example on account of the reflective configuration 22. For this purpose, the optical axis of the pumping light beam P and the normal to the flat side 24 need not run parallel to one another. All that is important is that the optical axis of the pumping light beam P intersects the flat side 24 of the crystal wafer 2.

Figure 3:
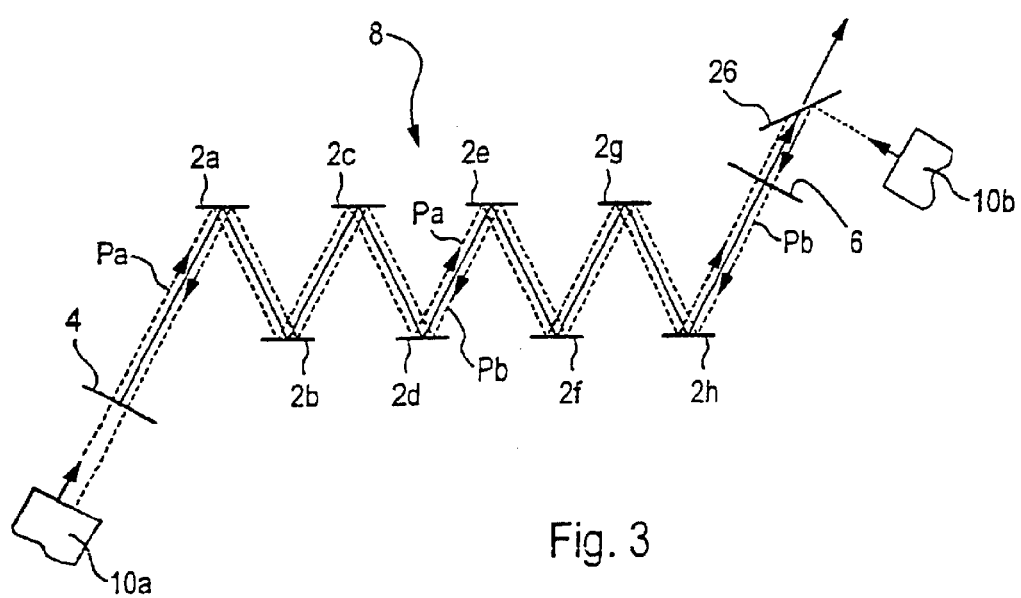
FIG. 3 is an illustration of the solid-state laser in which two pumping light beams are coupled into a resonator.

In accordance with FIG. 3, eight crystal wafers 2a–2h are disposed optically one after the other. In this exemplary embodiment, two pumping light sources 10a, 10b are provided, since the absorption of the pumping light beam Pa generated by the pumping light source 10a which takes place in the first four crystal wafers 2a–2d no longer ensures to a sufficient extent excitation of the crystal wafers 2e–2h disposed optically downstream. The two pumping light beams Pa, Pb propagate in one another in opposite directions in the resonator 8 and are coupled into the resonator mirrors 4 and 6, respectively, at the mutually opposite ends of the resonator 8, in this exemplary embodiment the resonator mirror 6 serving as a coupling-out mirror being transparent for the wavelength of the pumping beam Pa, Pb. A beam splitter 26 disposed outside the resonator 8 is provided for coupling the pumping light beam Pb into the beam path of the laser beam L.

Figure 4A:
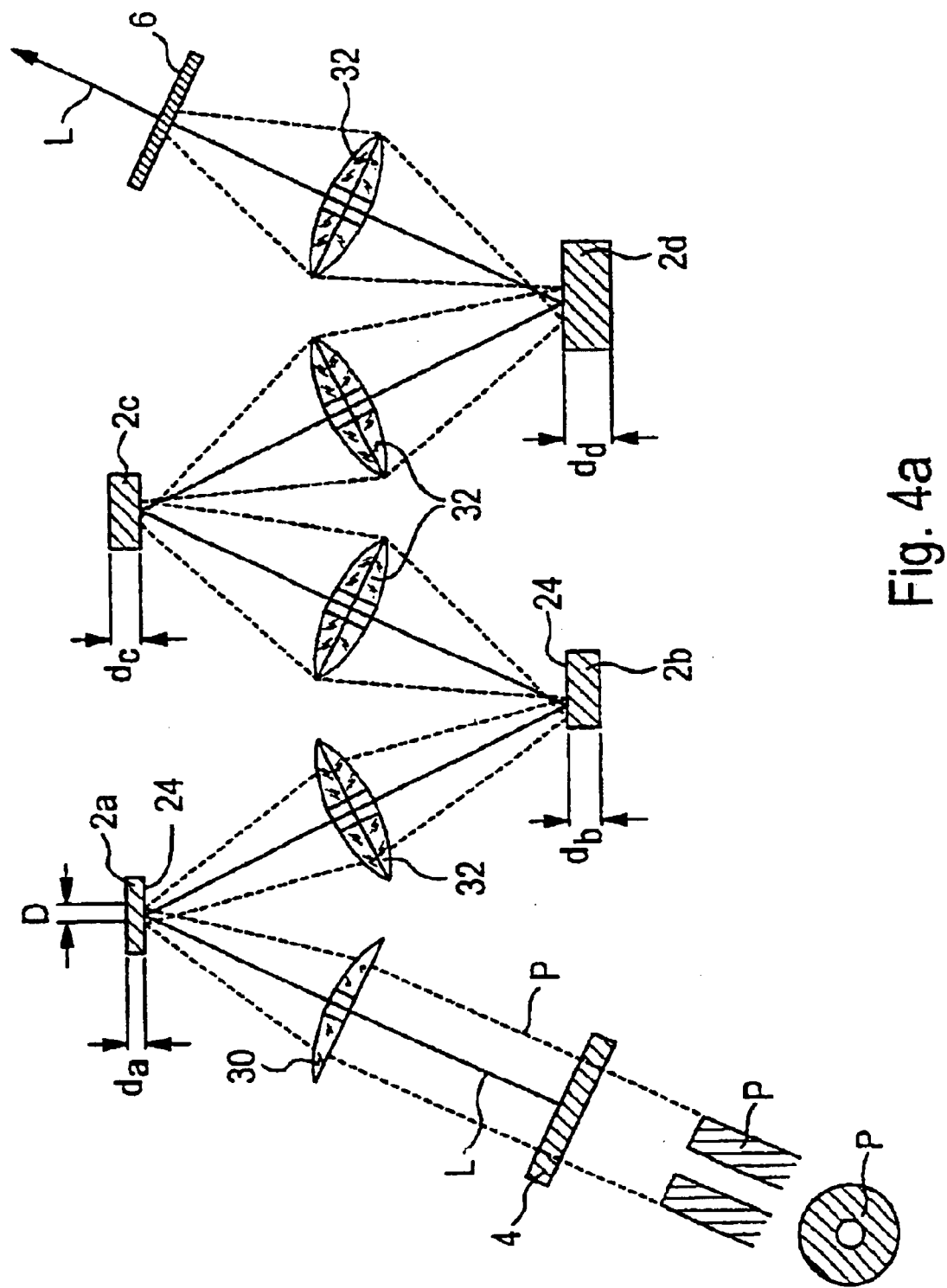
FIGS. 4a and 4b are sectional views of embodiments in which a pumping light beam is focused, within the resonator, onto the crystal wafers with annular lenses.

In the exemplary embodiment in accordance with FIG. 4a, the different propagation conditions—already explained above—for the pumping light beam P, on the one hand, and for the laser beam L, on the other hand, are emphasized more clearly. In a first resonator-internal lens 30, the pumping light beam P generated by a laser diode stack, for example, is focused onto the first crystal wafer 2a in such a way that its cross section on the flat side 24 forms a circular disc with a diameter D of about 5 mm, for example. The laser beam L is then generated in the zone defined in this way. The pumping light beam P which is reflected on the rear side of the crystal wafer 2a and emerges from it has a high degree of divergence and is focused by the lens 32 onto the optically downstream crystal wafer 2b, so that an image of the area of the crystal wafer 2a which is illuminated by the pumping light P is generated on the flat side 24 of the crystal wafer 2b. The laser beam L has a diameter that approximately corresponds to the diameter of the illuminated area and, in the FIG. 4a, for the sake of clarity, is represented only as a line coinciding with the optical axis of the two beams P, L. The lenses 30, 32 used in the exemplary embodiment are hollow in the region of the optical axis, i.e. are configured as annular lenses, so that they do not image or focus the laser beam L and have no effect on the properties of the resonator 8 which influence the laser beam L.

In accordance with the exemplary embodiment, the pumping light beam P preferably has an annular cross section, so that the entire pumping light beam P is captured and focused by the lenses 30, 32.

In order to ensure that the pumping power absorbed by each crystal wafer 2a–2d has the same magnitude despite the pumping light beam intensity which decreases from crystal wafer to crystal wafer, the thickness da-dd of the crystal wafers 2a–2d increases as the number of respective upstream crystal wafers rises, i.e. $d_a < d_b < d_c < d_d$, as is illustrated diagrammatically in the FIG. 4a. The variation of the thickness is to be adapted to the concrete propagation conditions for the pumping light beam in the resonator 8. In the configuration in accordance with FIG. 3, therefore, the thickness of the crystal wafers in each case increases toward the center of the resonator 8, so that, in the configuration, the crystal wafers disposed centrally have a greater thickness than the crystal wafers disposed at the resonator ends. As an alternative to this, the chemical composition, i.e. the doping, can also be adjusted accordingly. In this case, given the same thickness of the crystal wafers, the doping—the doping with Yb in the case of Yb:YAG as laser-active medium—increases as the number of respective upstream crystal wafers rises. As an alternative to this, it is also possible for both the thickness and the doping to be varied suitably in order to achieve the situation in which each crystal wafer absorbs approximately the same pumping power.

Figure 4B:
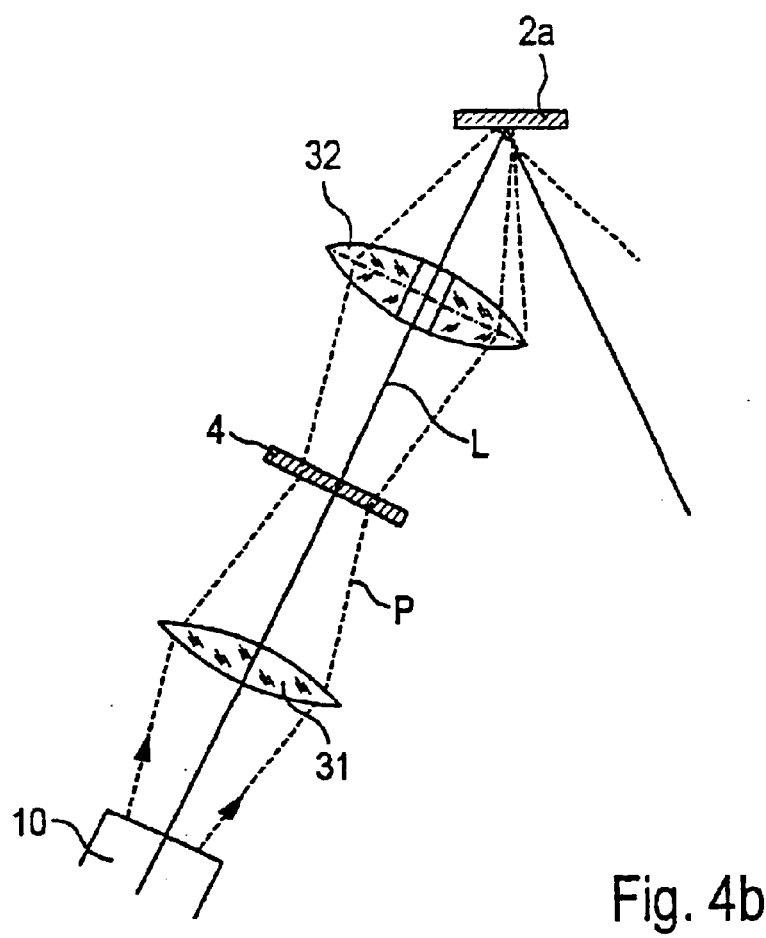

In accordance with FIG. 4b, instead of a pumping light beam which forms a parallel pencil externally to the resonator 8, a divergent pumping light beam P generated by the pumping light source 10 is provided which is imaged onto the resonator mirror 4 via a resonator-external lens 31, so that it propagates, proceeding from the mirror 4, internally in the resonator in the same way as the pumping light beam respectively emerging from the crystal wafers 2a–2d. As a result, the lenses 32 used internally in the resonator for its imaging can be identical.

Figure 5:
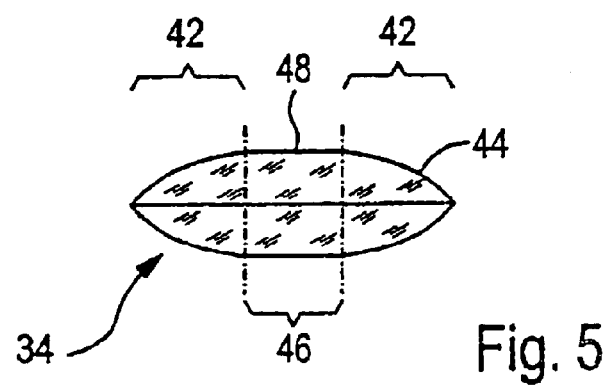
FIG. 5 is a sectional view of an alternative embodiment of a lens that is suitable for focusing the pumping light beam.

As the resonator-internal imaging element, instead of a lens with a central opening, it is also possible to provide, in accordance with FIG. 5, a lens 34 that has a curved surface 44 only in an annular region 42 but is provided with planar surfaces 48 in its central region 46.

Figure 6:
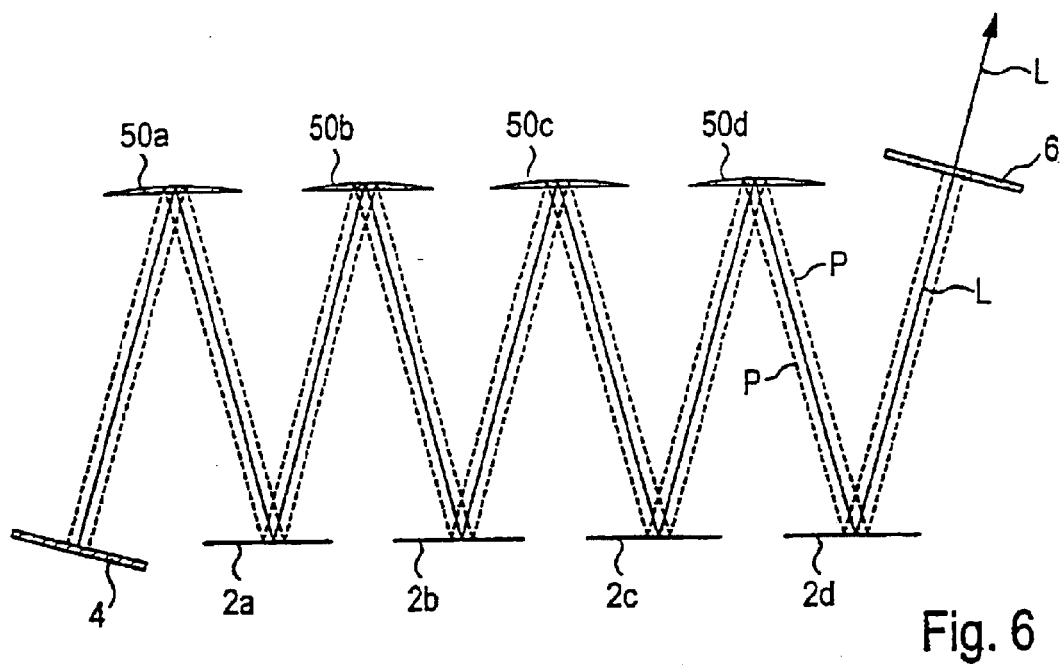
FIG. 6 is an illustration of an embodiment in which mirrors are provided as resonator-internal imaging elements.

In the exemplary embodiment in accordance with FIG. 6, the solid-state laser contains the four crystal wafers 2a–2d which are disposed in a row and which are each assigned a mirror element 50a–50d opposite them. Both the laser beam L emerging at one of the crystal wafers 2a–2d and the pumping light beam P are reflected at the mirror element 50a–50d before they again enter into the crystal wafer 2a–2d disposed optically downstream.

Figure 7A:
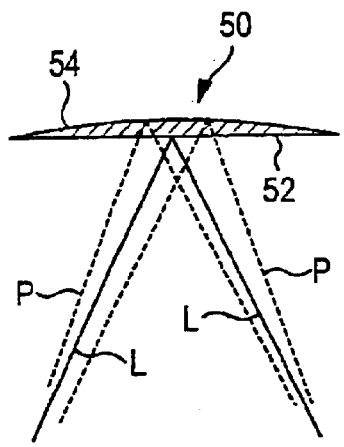
FIGS. 7a and 7b are sectional views each showing a mirror which is suitable for the embodiment in accordance with FIG. 6 in an enlarged illustration.

In accordance with FIG. 7a, a mirror element 50 is configured, at its surface 52 facing the crystal wafers, as a planar mirror, and has a rear surface 54 situated behind in the propagation direction of the laser beam L or of the pumping light beam P. The surface 52 is highly reflective for the laser beam L and transmissive for the pumping light beam P and the rear surface 54 being highly reflective for the pumping light beam P. In this way, the pumping light beam P can be refocused without beam shaping of the laser beam L accompanying this.

Figure 7B:
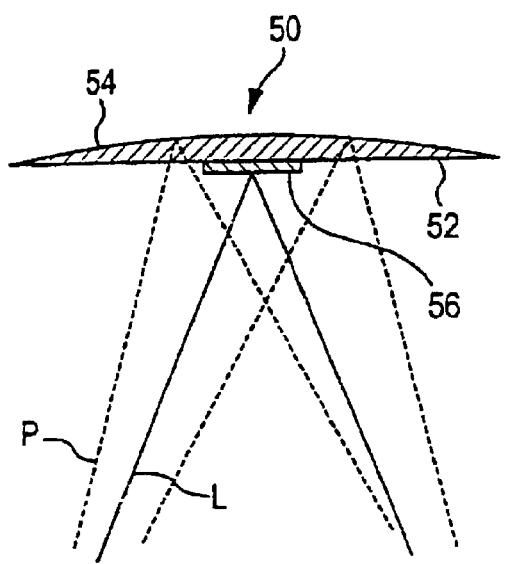

As an alternative to this, in accordance with FIG. 7b, by analogy with the exemplary embodiments in which lenses are used for imaging, it is possible to provide a spatially varying mirror coating of the surface 52 which need not be wavelength-selective, for example a disc-shaped central mirror coating 56—only adapted to the diameter of the laser beam L—of the surface 52 and a complete mirror coating of the surface 54. In other words, the surface 52 is highly transmissive for the pumping light beam P in an annular region outside the mirror coating 56 and highly reflective at least for the pumping light beam P at the rear surface 54.

Figure 8:
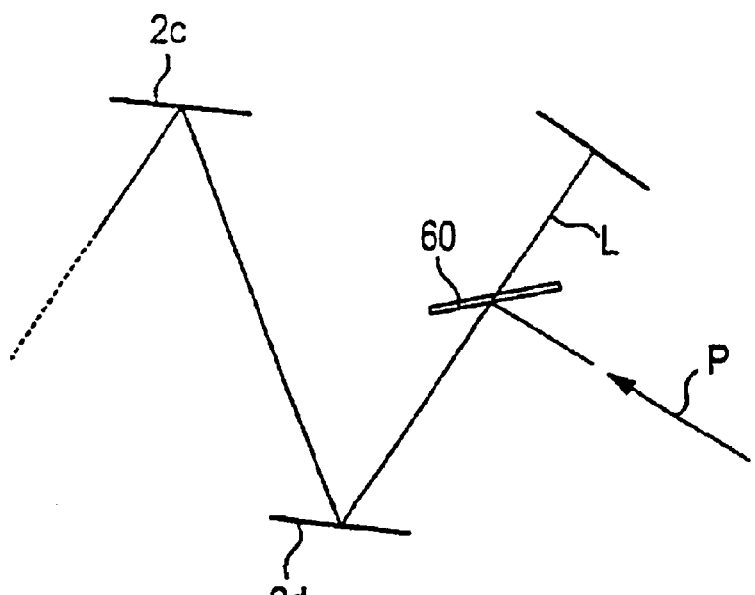
FIG. 8 is an illustration of an alternative coupling of the pumping light beam into the resonator.

In the exemplary embodiment in accordance with FIG. 8, the pumping light beam is not coupled in through one of the resonator mirrors 4, 6 but rather transversely with respect to the laser beam L by a beam splitter 60. Such coupling-in is advantageous in particular when a multiplicity of crystal wafers, for example more than 8, are optically coupled, so that even two-sided coupling-in of a pumping light beam P no longer suffices for excitation of the crystal wafers disposed in the center of the resonator 8. In this case, pumping light can be coupled into the beam path of the laser beam L at any desired point by such the beam splitter 60 disposed within the resonator 8.

Figure 9:
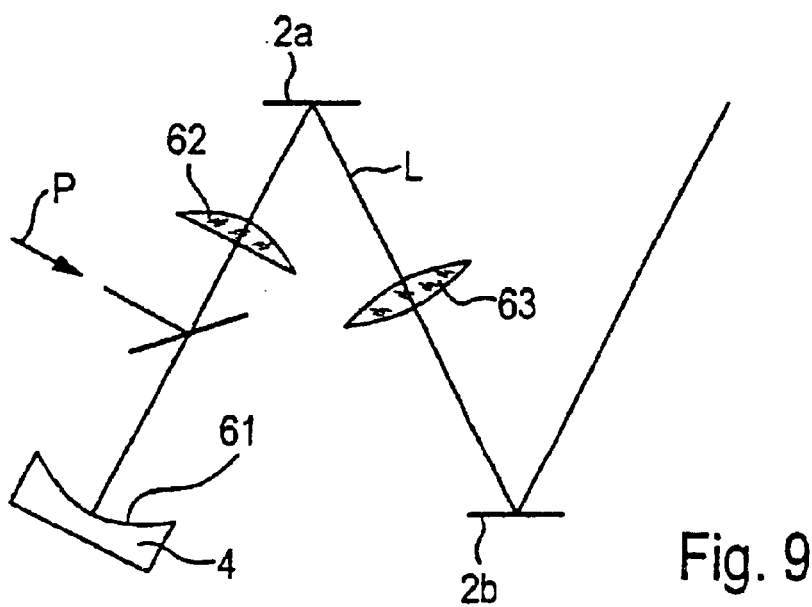
FIG. 9 is an illustration showing an embodiment with a resonator mirror with a curved surface.

Coupling-in with the beam splitter 60 is provided in the exemplary embodiment in accordance with FIG. 9, in which at least one of the resonator mirrors 4, 6 is provided with a curved reflective surface 61, thereby producing a stable resonator. In this exemplary embodiment, it is also possible for beam shaping of the laser beam L also to be carried out through the resonator-internal imaging elements used for focusing the pumping light beam P, lenses 62, 63 in the example, which, in contrast to the embodiment in accordance with FIG. 5, have a curved surface in the central region. The use of a correspondingly beam-shaping resonator mirror results in a resonator having the beam-shaping properties desired in each case.

Figure 10:
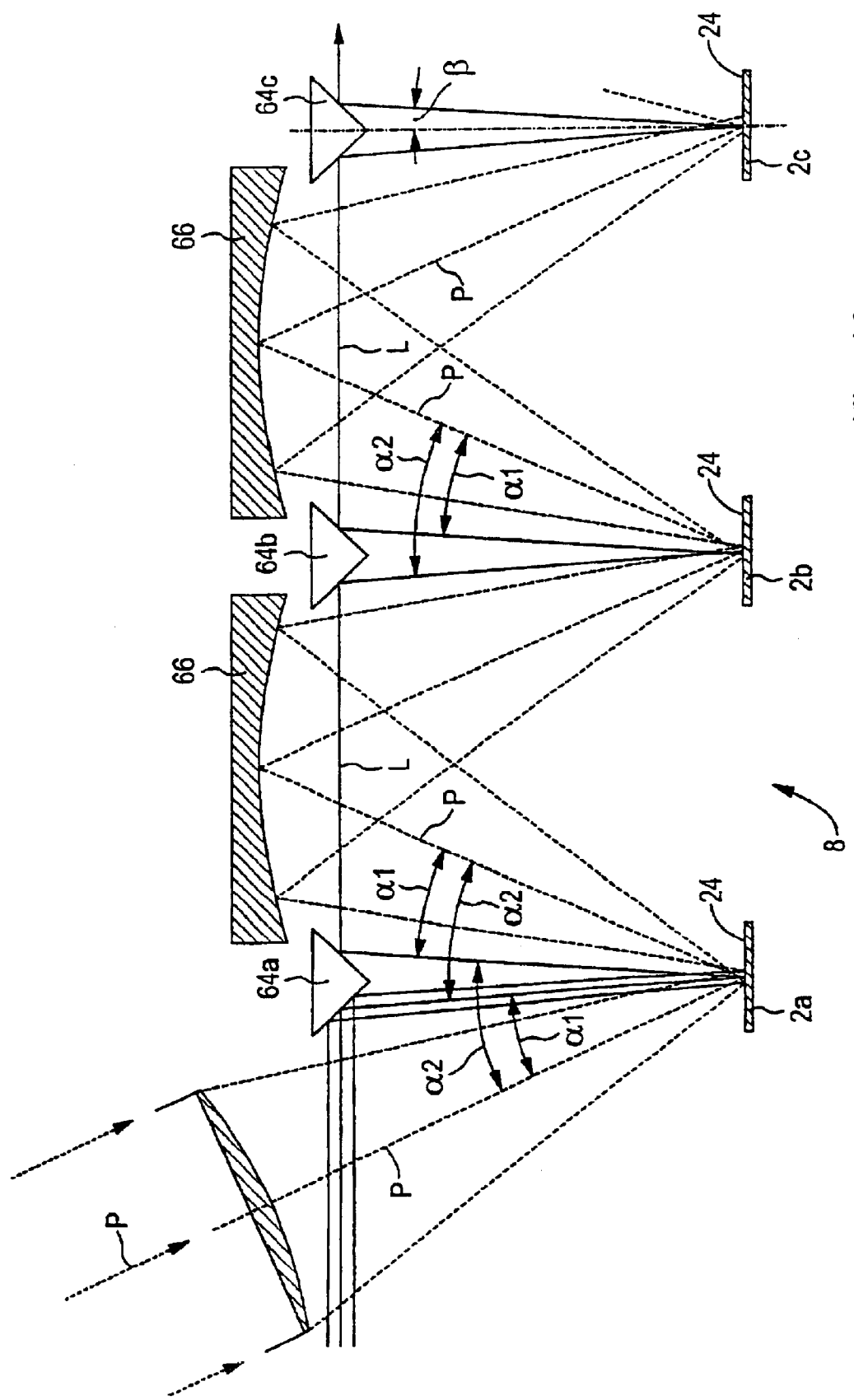
FIG. 10 is a sectional view of an embodiment in which the beam path of the laser beam and the beam path of the pumping light beam are not collinear with respect to one another.

In the exemplary embodiment in accordance with FIG. 10, the optical axes of the laser beam L and of the pumping light beam P likewise run in a single common plane but are inclined with respect to one another, that is to say are not collinear. This is illustrated in FIG. 10 by the angles $\alpha 1$, $\alpha 2$ between the optical axes of the laser beam L and pumping light beam P that intersect the surface 24. For this purpose, each crystal wafer 2a–2c is assigned a deflection mirror unit 64a–64c, which deflects the laser beam L emerging at a small angle $\beta$ to the normal from the surface of the crystal wafer 2a–2c and projects it via the deflection mirror 64a–64c assigned to the optically downstream crystal wafer 2a–2c onto this crystal wafer 2a–2c. The pumping light beam P impinges on the crystal wafers 2a–2c at a larger angle of incidence of $\alpha 1+\beta$, so that pumping light beam P and laser beam L overlap only in a small region in the vicinity of the crystal wafer 2a–2c. On account of the mutually inclined optical axes, pumping light beam P and laser beam L are separated, so that the optical imaging elements required for forwarding the pumping light beam P onto the next crystal wafer 2a–2c can be disposed outside the beam path of the laser beam L. For this purpose, a respective concave mirror 66 is provided in the exemplary embodiment. Moreover, neither a beam splitter nor a correspondingly transmissive resonator mirror is required for coupling the pumping light beam P into the resonator 8.

We claim:

1. A solid-state laser having an active medium for generating a laser beam, comprising:
   a resonator;
   a plurality of crystal wafers disposed in said resonator and are optically coupled to one another and form a common beam path for the laser beam;
   a pumping light source for generating a pumping light beam whose optical axis is collinear with respect to an optical axis of the laser beam, said pumping light source disposed upstream of said resonator; and
   at least one lens functioning as an imaging element for focusing the pumping light beam emerging from one of said crystal wafers onto another one of said crystal wafers disposed downstream, said lens disposed within said resonator, and said lens having a central opening formed therein.

2. The solid-state laser according to claim 1, wherein said lens has a surface that is curved only in an annular edge region.

3. The solid-state laser according to claim 1, wherein the pumping light beam has an annular cross section and is coupled into said resonator.

4. The solid-state laser according to claim 1,
   wherein said crystal wafers have flat sides; and
   including a mirror surface disposed on one of said flat sides of said crystal wafers, said mirror surface reflecting the pumping light beam and the laser beam back into said crystal wafers.

5. The solid-state laser according to claim 4, wherein said crystal wafers are disposed in such a way as to produce a folded beam path for the laser beam.

6. The solid-state laser according to claim 1, wherein said crystal wafers which are optically disposed one after another in a propagation direction of the pumping light beam each substantially absorb an equivalent pumping light power.

7. The solid-state laser according to claim 6, wherein, in order to equalize an absorbed pumping light power, said crystal wafers each have a thickness being different from one another.

8. The solid-state laser according to claim 6, wherein, in order to equalize an absorbed pumping light power, said crystal wafers have a chemical composition being different from one another.

9. The solid-state laser according to claim 1, wherein said resonator has a wavelength-selective resonator mirror for coupling the pumping light beam into said resonator, said wavelength-selective resonator mirror is reflective for the laser beam and transmissive for the pumping light beam.

10. The solid-state laser according to claim 1, including a beam splitter for coupling the pumping light beam into a beam path of the laser beam.

11. The solid-state laser according to claim 9, wherein said resonator has a further wavelength-selective resonator mirror for coupling out the laser beam, said further wavelength-selective resonator mirror transmits at least part of the laser beam and reflects the pumping light beam.

12. The solid-state laser according to claim 1, including a further pumping light source generating a further pumping light beam coupled into said resonator, and the pumping light beam and the further pumping light beam propagate in mutually opposite directions in said resonator.

* * * * *